(12) United States Patent
Gu et al.

(10) Patent No.: US 9,389,593 B2
(45) Date of Patent: *Jul. 12, 2016

(54) METHODS AND DEVICES FOR OPERATING MOBILE TERMINAL ALARM CLOCK UNDER SHUTDOWN STATE

(71) Applicant: Beijing Xiaomi Technology Co., Ltd., Beijing (CN)

(72) Inventors: Linghua Gu, Beijing (CN); Anyu Liu, Beijing (CN); Dongjie Qi, Beijing (CN); Xinyu Liu, Beijing (CN)

(73) Assignee: Beijing Xiaomi Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/503,856

(22) Filed: Oct. 1, 2014

(65) Prior Publication Data
US 2015/0016233 A1 Jan. 15, 2015

Related U.S. Application Data

(63) Continuation of application No. 13/955,824, filed on Jul. 31, 2013, now Pat. No. 8,880,121.

(30) Foreign Application Priority Data

Aug. 15, 2012 (CN) .......................... 2012 1 0291619

(51) Int. Cl.
H04M 11/04 (2006.01)
H04W 24/00 (2009.01)
(Continued)

(52) U.S. Cl.
CPC .............. G04G 13/025 (2013.01); G04G 13/02 (2013.01); H04M 1/725 (2013.01)

(58) Field of Classification Search
CPC ... G04G 13/02; G04G 13/025; G04G 13/028; H04M 1/72538; G04B 23/02; G04B 25/005
USPC ................................ 455/404.1, 550.1, 556.1
See application file for complete search history.

(56) References Cited

U.S. PATENT DOCUMENTS

| 4,470,706 A | 9/1984 | Nishimura et al. |
| 5,555,536 A | 9/1996 | Rolf et al. |

(Continued)

FOREIGN PATENT DOCUMENTS

| CN | 1749887 A | 3/2006 |
| CN | 1980430 A | 6/2007 |

(Continued)

OTHER PUBLICATIONS

International Search Report issued Oct. 24, 2013 in International Application No. PCT/CN2013/081526.

(Continued)

Primary Examiner — Simon Nguyen
(74) Attorney, Agent, or Firm — Brinks, Gilson & Lione

(57) ABSTRACT

A mobile terminal may comprise an executing unit being configured to activate an alarm clock when the mobile terminal is off. The mobile terminal may be configured to receive a target alarm clock activation time; determine a time difference between a current time and the target alarm clock activation time; and compare the time difference with a first reference time period. Upon determining that time difference is less than the first reference time period, the mobile terminal may start up. Upon determining that the time that the mobile terminal completes the startup is less than a second reference time period, the mobile terminal may activate the alarm clock.

20 Claims, 5 Drawing Sheets

(51) Int. Cl.
*G04G 13/02* (2006.01)
*H04M 1/725* (2006.01)

(56) References Cited

U.S. PATENT DOCUMENTS

| | | |
|---|---|---|
| 5,559,762 A | 9/1996 | Sakamoto |
| 2005/0141677 A1 | 6/2005 | Hyttinen et al. |
| 2007/0036036 A1 | 2/2007 | Kadish et al. |
| 2008/0102786 A1* | 5/2008 | Griffin ............. H04L 12/66 455/404.2 |
| 2009/0059733 A1* | 3/2009 | Li .................. G04G 13/021 368/262 |
| 2009/0281835 A1* | 11/2009 | Patwardhan ...... G06F 19/3406 705/3 |
| 2010/0010775 A1 | 1/2010 | Ohkubo et al. |
| 2010/0069054 A1* | 3/2010 | Labidi ............... G01C 21/20 455/418 |
| 2011/0317526 A1 | 12/2011 | Go |
| 2012/0307604 A1* | 12/2012 | Wang ................ G04G 13/023 368/245 |

FOREIGN PATENT DOCUMENTS

| | | |
|---|---|---|
| CN | 200710044565.X | 7/2007 |
| CN | 101102567 A | 1/2008 |
| CN | 101360290 A | 2/2009 |
| CN | 101909112 A | 12/2010 |
| CN | 102821207 A1 | 12/2012 |
| JP | 05-197461 A | 8/1993 |
| JP | 2000-286930 A | 10/2000 |
| RU | 2010121867 A | 12/2011 |
| WO | 2009/148472 A2 | 12/2009 |

OTHER PUBLICATIONS

Russian Office Action corresponding to Russian Patent Application No. 2014153903/07(086252), dated Jan. 20, 2016 including English Translation (17p).

* cited by examiner

METHODS AND DEVICES FOR OPERATING MOBILE TERMINAL ALARM CLOCK UNDER SHUTDOWN STATE

PRIORITY STATEMENT

This application is a continuation of U.S. application Ser. No. 13/955,824, now US Patent Publication No. 20140051478 A1, filed on Jul. 31, 2013, in the United States Patent and Trademark Office, which claims the priority benefit of Chinese Patent Application No. CN201210291619.3, filed Aug. 15, 2012, the disclosures of which are incorporated herein in their entirety by reference

BACKGROUND OF THE INVENTION

1. Field of the Invention

The disclosure relates to the technical field of mobile terminals. Specifically, the disclosure relates to methods and devices for actuating an alarm clock when a mobile terminal is under a shutdown state.

2. Description of the Related Art

With the development of mobile communication technologies, mobile terminals, such as mobile phones, have become an essential communication tool for people. An alarm clock is a feature in a mobile phone (cordless telephone) that is frequently used. However, there are some mobile phones which do not implement functionality to activate the alarm clock when the mobile phones are under a shutdown state (i.e., the mobile phone is turned off).

The majority of existing implementations for activating an alarm clock when a mobile terminal is under the shutdown state use a local RTC (Real time clock). For example, some models that use local RTC add a dedicated timing chip outside a baseband chip that interacts with the timing information of the processor of the mobile terminal. In another example, some models that use local RTC count pulses generated by an oscillating circuit inside the baseband chip.

These types of circuits for awakening an alarm clock when a mobile terminal is turned off, however, are unable to be implemented in mobile terminals that adopt Android™ operation system.

SUMMARY OF THE INVENTION

The present disclosure provides methods and devices for activating an alarm clock when a mobile terminal is under a shutdown state, thereby bringing better user experiences to a user.

According to an aspect of the present disclosure, a mobile terminal may comprise at least one non-transitory storage medium and at least one executing unit. The at least one non-transitory storage medium may comprise an application for operating an alarm clock function when the mobile terminal is off. The at least one executing unit may be in communication with the at least one non-transitory storage medium that is configured to execute the application and may be configured to receive a target alarm clock activation time; determine a first time difference between a current time and the target alarm clock activation time; and compare the first time difference with a first reference time period. When the time difference is less than the first reference time period, the at least one executing unit may be configured to execute a startup operation; receive a startup-completion time when the startup operation is completed; determine the startup-completion time to be an actual alarm clock activation time; and execute an activation operation to the alarm clock at the actual alarm clock activation time.

According to an aspect of the present disclosure, to determine the startup-completion time to be the actual alarm clock activation time, the at least one executing unit may be further configured to determine a second time difference between the startup-completion time and the target alarm clock activation time; and compare the second time difference with a second reference time period. When the second time difference is less than the second reference time period, the at least one executing unit may be configured to search a state of the alarm clock within the second reference time period from the target alarm clock activation time; and determine the startup-completion time to be the actual alarm clock activation time when the state of the alarm clock shows that the alarm clock has not been activated.

According to an aspect of the present disclosure the at least one executing unit may be further configured to execute no alarm clock activation when the second time difference is more than the second reference time period; or the state of the alarm clock shows that the alarm clock has been activated within the second reference time period from the alarm clock activation time.

According to an aspect of the present disclosure, the at least one executing unit may be further configured to set the target alarm clock activation time when the mobile terminal is on; and store a ring tone associated with an alarm clock in one of the at least one storage medium when the mobile terminal is under the turn-on state.

According to an aspect of the present disclosure, the at least one executing unit may be further configured to copy the ring tone from a Secure Digital card of the mobile terminal. The Secure Digital card may not be accessible for the at least one executing unit when the mobile terminal is off. The one of the at least one storage medium may be accessible for the at least one executing unit when the mobile terminal is off.

According to an aspect of the present disclosure, the at least one executing unit is further configured to receive an instruction to the activation operation from a user of the mobile terminal; and execute the instruction to the activation operation, wherein the instruction for processing the activation operation may be sliding of a designated object of the mobile terminal from a designated initial position of the mobile terminal to a designated target position of the mobile terminal over a pre-defined path. The instruction to the activation operation may comprise one of terminating the activation operation, continuing the activation operation, terminating the activation operation and resume the activation operation after a pre-determined period of time, and terminating the activation operation and turning off the mobile terminal.

According to an aspect of the present disclosure, the mobile terminal may be operated under an Android™ operation system.

According to an aspect of the present disclosure, a method for activating an alarm clock application when a mobile terminal is under a shutdown state may comprise receiving, by a mobile terminal, a target alarm clock activation time; determining, by the mobile terminal, a first time difference between a current time and the target alarm clock activation time; and comparing, by the mobile terminal, the first time difference with a first reference time period. When the time difference is less than the first reference time period, the method may comprise executing, by the mobile terminal, a startup operation; receiving, by the mobile terminal, a startup-completion time when the startup operation is completed; determining, by the mobile terminal, the startup-completion time to be an actual alarm clock activation time; and executing, by the mobile terminal, an activation operation to the alarm clock at the actual alarm clock activation time.

According to an aspect of the present disclosure, the determining the startup-completion time to be the actual alarm clock activation time may comprise determining, by the mobile terminal, a second time difference between the startup-completion time and the target alarm clock activation time; and comparing, by the mobile terminal, the second time difference with a second reference time period. When the second time difference is less than the second reference time period, the method may further comprise searching a state of the alarm clock within the second reference time period from the target alarm clock activation time; and determining, by the mobile terminal, the startup-completion time to be the actual alarm clock activation time.

According to an aspect of the present disclosure, the method may further comprise executing, by the mobile terminal, no alarm clock activation when the second time difference is more than the second reference time period; or when the state of the alarm clock shows that the alarm clock has been activated within the second reference time period from the alarm clock activation time.

According to an aspect of the present disclosure, the method may further comprise setting, by the mobile terminal, the target alarm clock activation time when the mobile terminal is under a turn-on state; and storing, by the mobile terminal, a ring tone associated with an alarm clock in one of the at least one storage medium.

According to an aspect of the present disclosure, the method may further comprise copying, by the mobile terminal, the ring tone from a Secure Digital card of the mobile terminal. And the storage medium may be accessible for the mobile terminal during the startup operation.

According to an aspect of the present disclosure, the method may further comprise receiving, by the mobile terminal, an instruction to the activation operation from a user of the mobile terminal; and executing, by the mobile terminal, the instruction to the activation operation, wherein the instruction for processing the activation operation may be sliding of a designated object of the mobile terminal from a designated initial position of the mobile terminal to a designated target position of the mobile terminal over a pre-defined path; wherein the instruction to the activation operation may comprise one of terminating the activation operation, continuing the activation operation, terminating the activation operation and resume the activation operation after a predetermined period of time, and terminating the activation operation and turning off the mobile terminal; and wherein the mobile terminal is operated under an Android™ operation system.

DETAILED DESCRIPTION OF THE PREFERRED EMBODIMENTS

Figure 1:
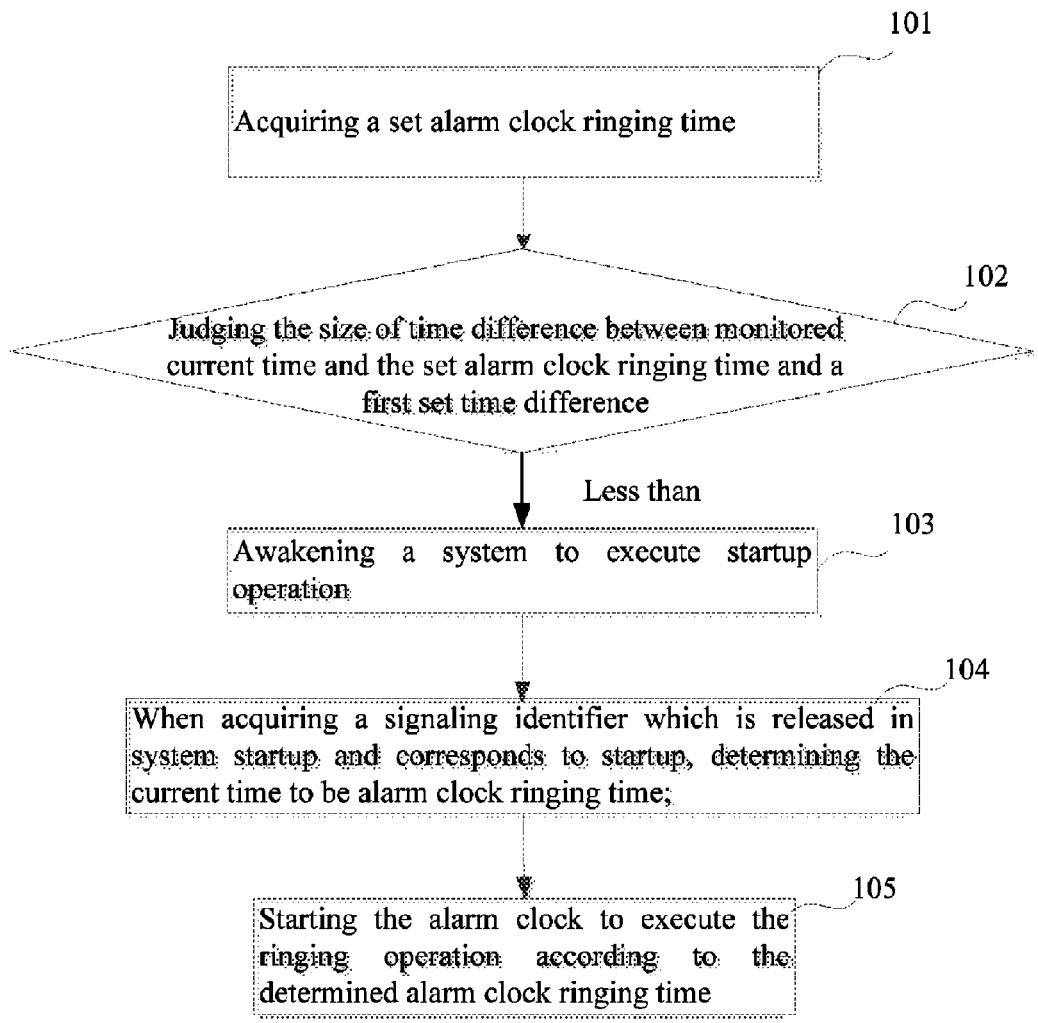
FIG. 1 illustrates a flow chart of a method for activating an alarm clock function when a mobile terminal is turned off according to a first example embodiment of the present disclosure.

Example embodiments will now be described more fully with reference to the accompanying drawings, in which the example embodiments are shown. The example embodiments may, however, be embodied in many different forms and should not be construed as being limited to the preferred embodiments set forth herein; rather, the example embodiments are provided so that this application will be thorough and complete, and will fully convey the concept of the invention to one skilled in the art. The drawings may be exaggerated for clarity and not necessarily in scale. Like reference numerals in the drawings denote like elements, and thus, their description will not be repeated.

Figure 7:
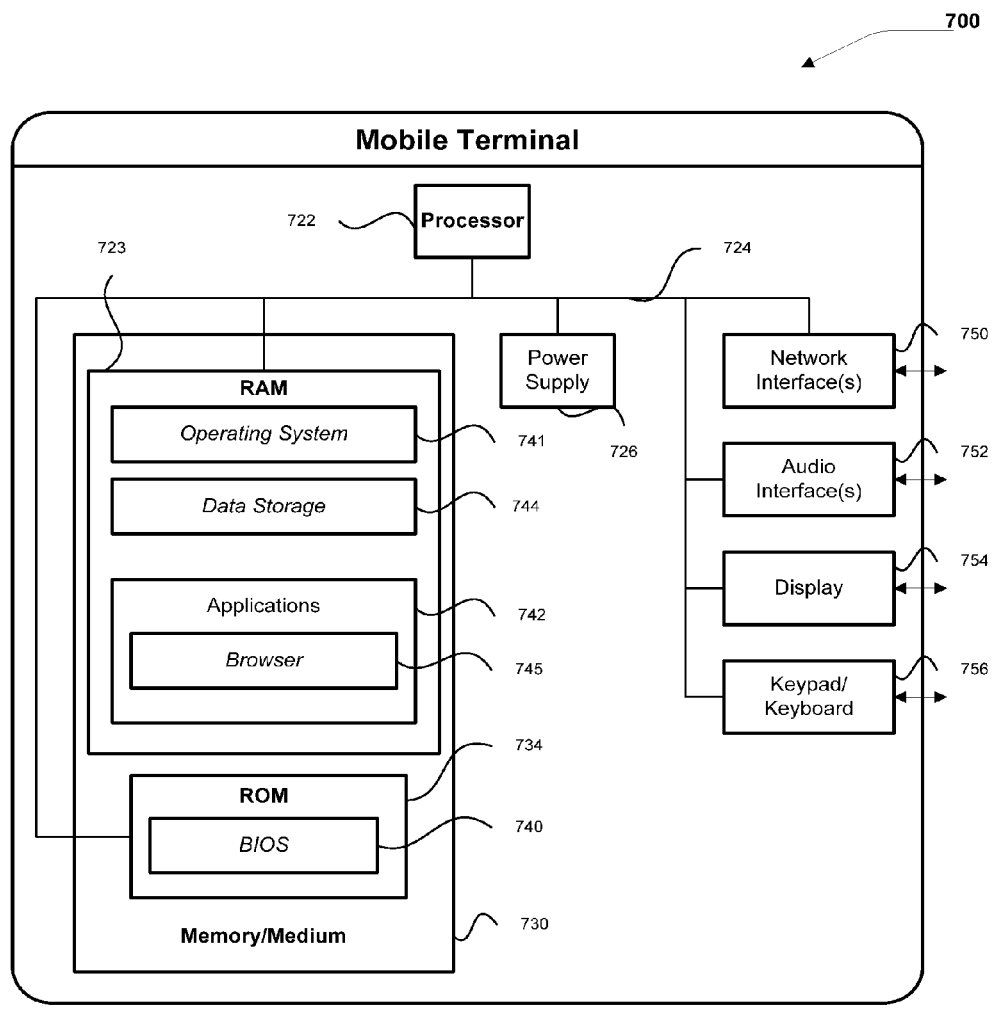
FIG. 7 is a schematic diagram illustrating an example embodiment of a mobile terminal.

FIG. 7 is a schematic diagram illustrating an example embodiment of a mobile terminal. A mobile terminal 700 may include a computing device capable of sending or receiving signals, such as via a wired or a wireless network. The mobile terminal 700 may, for example, be a portable device, such as a laptop computer, a tablet computer, a cellular telephone or a smart phone, a display pager, a radio frequency (RF) device, an infrared (IR) device, a Personal Digital Assistant (PDA), a handheld computer, a set top box, a wearable computer, an integrated device combining various features, such as features of the forgoing devices, or the like.

The mobile terminal 700 may vary in terms of capabilities or features. Claimed subject matter is intended to cover a wide range of potential variations. For example, the mobile terminal 700 may include a keypad/keyboard 756. It may also comprise a display 754, such as a liquid crystal display (LCD), or a display with a high degree of functionality, such as a touch-sensitive color 2D or 3D display (e.g., a touch-screen). In contrast, however, as another example, a web-enabled mobile terminal 700 may include one or more physical or virtual keyboards, mass storage medium 730, and/or a global positioning system (GPS) or other location-identifying type capability.

The mobile terminal 700 may also include or may execute a variety of operating systems 741, including an operating system, such as a Windows™ or Linux™, or a mobile operating system, such as iOS™, Android™, or Windows Mobile™, or the like. The mobile terminal 700 may include or may execute a variety of possible applications 742, such as a browser and/or an alarm clock application 745. An application 742 may enable communication with other devices, such as communicating one or more messages, such as via email, short message service (SMS), or multimedia message service (MMS), including via a network, such as a short message network or an Internet network.

Further, the mobile terminal 700 may include one or more non-transitory computer-readable and/or processor-readable storage media 730 and one or more processors 722 in communication with the non-transitory computer-readable and/or processor-readable storage medium 730. For example, the non-transitory computer-readable and/or processor-readable storage medium 730 may be RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 730 may store sets of instructions, or units and/or modules, that comprise the sets of instructions, for conducting operations described in the present disclosure. The one or more processors 722 may be configured to execute the sets of instructions and perform the operations in the mobile terminal 700.

Merely for illustration, only one processor will be described in the mobile terminals (e.g., mobile phones) of the following example embodiments to perform the operations. However, it should be note that the mobile terminals in the present disclosure may also comprise multiple processors, thus operations that is performed by one processor as described in the present disclosure may also be jointly or separately performed by the multiple processors. For example, if in the present disclosure a processor of a mobile terminal executes both step A and step B, it should be understood that step A and step B may also be performed by two different processors jointly or separately in the mobile terminal (e.g., the first processor executes step A and the second processor executes step B, or the first and second processors jointly execute steps A and B).

According to an example embodiment of the present disclosure, the processor 722 may comprise a clock (not shown), which may remain activated even when the mobile terminal is turned off (i.e., a shutdown state). The clock may be an internal circuit of the processor. Alternatively, the clock may be external to a computational circuit of the processor, i.e., the clock may be an independent circuit built separate from the majority circuits of the processor. When a user sets an alarm clock activation time in an alarm clock application 745, the alarm clock application 745 may send the alarm clock activation time to the clock. For example, the alarm clock application 745 may save the alarm clock activation time in a storage unit where the clock may access when the mobile terminal is turned off. The alarm clock, accordingly, may initiate a startup operation at a proper time and wake up the mobile terminal from the turn-off mode.

FIG. 1 illustrates a flow chart of a method for activating an alarm clock function when a mobile terminal (e.g., the mobile terminal 700 in FIG. 7) is turned off according to a first example embodiment of the present disclosure.

At step 101, a processor of a mobile terminal may acquire and/or receive a target alarm activation time. The alarm clock activation time may be a target time that is pre-set and/or predetermined for ringing an alarm clock (e.g., an alarm clock function, which may include audible alarms, vibrations, or any other mechanism for alerting a user that the selected time has occurred) of a mobile terminal.

At step 102, the processor of the mobile terminal may determine a time difference (i.e., a first time difference) between the current time monitored by the mobile terminal and the target alarm clock activation time, and then periodically compare the time difference with a first reference time period.

The first reference time period may be a pre-determined reference length of time for determining if a time is close enough to the target alarm clock activation time. It may be pre-loaded in the operation system of the mobile phone and may or may not be a user accessible and/or adjustable parameter. The first reference time period may be saved, through the alarm clock application, in an operation system storage unit, to which a clock of the processor may be able to access when the mobile terminal is turned off. The first reference time may be a length of time to allow the mobile terminal to complete the startup operation but not substantially longer. For example, the first reference time period may be two (2) minutes. As a result, the time between the mobile terminal being completely turned on and the target alarm clock activation time may be short. Consequently, the possibility that the mobile terminal is turned off again after being turning on but before the target alarm clock activation time may be low.

When the processor determines that the first time difference is less than the first reference time period, i.e., the current time is close enough to the target alarm clock activation time, the processor may execute step 103. At step 103, the processor may execute a startup operation to turn the mobile terminal on through an awakening system in the mobile terminal. Through the awakening system, the processor and/or the mobile terminal may awaken from a turn-off mode (i.e., turn-off state) or sleep mode or hibernate mode. During this time, the processor may acquire and/or receive a signaling identifier, which may be released by an operation system of the mobile terminal upon completion of the startup operation. For example, for a mobile terminal operating an Android™ system, the Android™ system may release a signaling identifier "boot.complete" when the startup operation is completed. This time may be called a startup-completion time.

After acquiring the signaling identifier, the processor may execute step 104. At step 104, the processor may determine that the startup-completion time is an actual alarm clock activation time.

At step 105, upon determining that the startup-completion time is the actual alarm clock activation time, the processor may ring the alarm clock by executing a ringing operation (e.g., an alarm clock activation operation) according to the determined actual alarm clock activation time.

Figure 2:
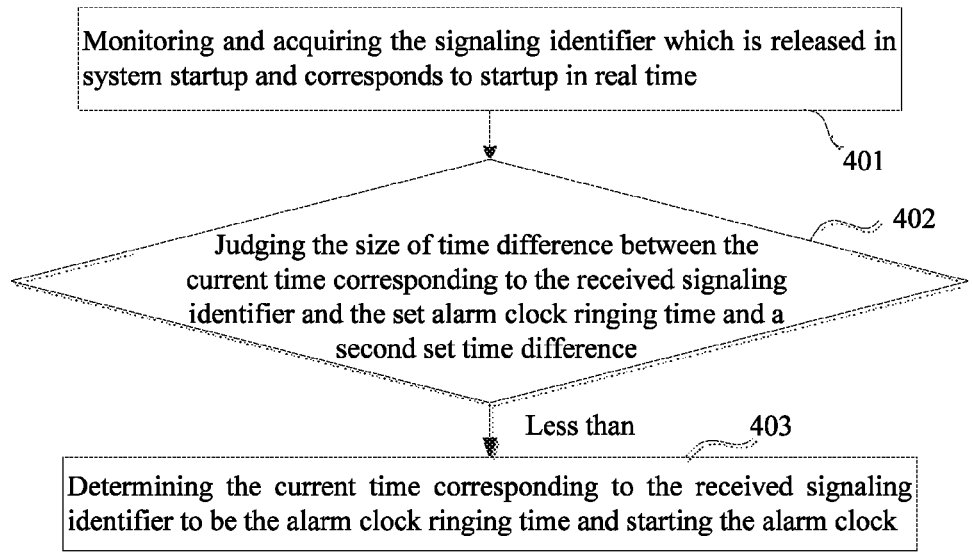
FIG. 2 illustrates details of a step of the method according to the first example embodiment of the present disclosure.

FIG. 2 illustrates details of step 104 for determining whether the startup-completion time is the actual alarm clock activation time when monitoring the signaling identifier. At step 401, the processor may conduct real-time monitoring and acquire and/or receive the signaling identifier.

At step 402, the processor may determine the time difference (i.e., a second time difference) between the startup-completion time (i.e., the time that the processor receives the signaling identifier) and the target alarm clock activation time. The processor then may compare the time difference with a second reference time period.

The second reference time period may be a pre-determined reference length of time for determining if a time is close enough to the target alarm clock activation time. For example, the second reference time period may be five (5) minutes within or after the target alarm clock activation time. Because different mobile terminals may take different length of time to complete a startup procedure, it may be possible that a mobile terminal completes a startup after the target alarm clock activation time. When such a situation occurs, the second reference time period may be a pre-determined reference length of time for determining if the startup-completion time is too late to activate the alarm. For example, if the startup operation takes the mobile terminal longer than the first reference time period, the wake-up may be later than the target alarm clock activation time. If the startup-completion time is within the second reference time period from the target alarm clock activation time, the processor may still activate the alarm under certain condition. If the startup-completion time is late more than the second reference time period, the processor may not activate the alarm.

The second reference time may be pre-loaded in a storage medium of the mobile phone to which the alarm clock application may access. It may or may not be a user accessible and adjustable parameter.

Upon determining that the second time difference is less than the second reference time period, the processor may execute step 403. At step 403, the processor may determine the startup-completion time corresponding to the received signaling identifier to be the actual alarm clock activation time, and then the processor may perform the alarm clock activation operation (e.g., a ringing operation) to ring the alarm clock. The alarm clock activation operation may include making a sound with particular ring tone from a speaker of the mobile terminal and/or making an audible and/or sensible alarm, such as vibration, from the mobile terminal. Further, the alarm clock activation operation may not be affected by an operation mode of the mobile terminal. For example, the ringing operation may not be affected even if the mobile terminal is under silent or vibrating mode.

In step 403, when determining that the time difference is less than the second reference time period and determining the current time (e.g., the startup-completion time) to be the actual alarm clock activation time, the processor may further check and/or determine a state identifier of the mobile terminal. The state identifier reflects a state of the mobile terminal at a particular moment. For example, the state identifier may be an alarm-clock identifier, which may reflect that the alarm clock has not yet been activated and the mobile terminal can operate the alarm clock. If the state identifier is an alarm-clock identifier, the processor may determine that the startup-completion time to be the actual alarm clock activation time.

The following is an implementation of the example embodiments of the present disclosure.

First, a target alarm clock activation time may be set and/or pre-determined when a mobile terminal is still on (e.g., when the mobile terminal is under a mode of ordinary operation). For example, when the mobile terminal is on, the target alarm clock activation time may be set for 9:00 A.M. during weekdays (e.g., from Monday to Friday of every week). This time may be expressed as time $t_0$. Further, the first reference time period may be set as time $\Delta t_1$. For example, the first reference time period $\Delta t_1$ may be set as 2 minutes. The first reference time period $\Delta t_1$ may be saved in a storage unit of the mobile terminal accessible by a clock of a processor when the mobile terminal is off.

Next, a ring tone for the alarm clock may be copied from an SD (Secure Digital) card into the storage unit (e.g., the processor-readable storage medium 730 in FIG. 7) of the mobile terminal accessible by the alarm clock application. This is because ring tones of the mobile terminal generally may be stored in an SD (Secure Digital) card of the mobile terminal. The SD card may not be activated when the system is turned on to execute the ringing operation (e.g., alarm clock activating operation) of the alarm clock, and thereby may not be accessible to the alarm clock application. Thus if the ring tone of the alarm clock is saved only in the SD card, the ring tone may not be available to the mobile terminal when it is awaken from a turn-off state. Without copying the ring tone to the storage unit, the mobile phone may only make blare or beep prompt tones that are pre-loaded in the operating system.

After the target alarm clock activation time is set and the ring tone for the alarm clock is selected from the SD card, the processor of the mobile terminal may record and save the ring tone in the storage unit (e.g., storage unit 51 in FIG. 5) of the mobile terminal. Table I illustrates a queue of events saved in the mobile terminal (e.g., a storage and/or the SD card) including the name (Event Tag), targeted time (Time), and status (State Identifier) of each event.

TABLE I

| Time | Event Tag | State Identifier | ... |
|------|-----------|------------------|-----|
| 1:00 | Alarm clock | 0 | ... |
| 1:20 | Short message | 0 | ... |
| 1:30 | Alarm clock | 1 | ... |
| ... | ... | ... | ... |
| 9:00 | Alarm clock | 1 | ... |

As shown in Table I, the event that triggers the alarm clock ringing operation is tagged as "Alarm clock." The state identifier of the mobile terminal that is corresponding to the event "Alarm clock" may be "1" (i.e., the alarm clock identifier), which may represent that the corresponding alarm clock activation operation has not yet been executed. Therefore, the mobile terminal (e.g., the processor) may execute the alarm clock activation operation if the startup-completion time is within the second reference time period from the target alarm clock activation time. Alternatively, the state identifier that is corresponding to the even "Alarm clock" may be "0," which may represent that the corresponding alarm clock ringing operation has been executed already. Accordingly, the mobile terminal (e.g., the processor) may not execute the clock ringing operation even if the startup-completion time is within the second reference time period from the target alarm clock activation time.

For example, as shown in Table I, there are three (3) alarm clock activation events between 1:00 A.M. and 9:00 A.M. The state identifier at 1:30 A.M. is "0," meaning that the alarm clock has already been activated. The state identifier is "1" at both 1:00 A.M. and 9:00 A.M., meaning both of the alarm clock events have not been activated. Thus if the mobile terminal is awakened at 8:59:50 A.M. and the second reference time period is 5 minutes, the mobile terminal may operate the alarm ringing operation set for 9:00 A.M. because 8:59:50 A.M. is within the 5 minutes range from the 9:00 target alarm clock activation time. However, the mobile terminal may not operate the alarm ringing operation set for 1:00 A.M., because 8:59:50 A.M. is outside the 5 minutes range from the 1:00 target alarm clock activation time.

Same applies when the mobile terminal takes longer time to startup so that the startup-completion time is later than the target clock ringing time $t_0$.

Back to the implementation of example embodiment above, when the mobile terminal is in a turn-off state, the processor may real-time monitor and acquire and/or receive the current time $t_1$. Further, the processor of the mobile terminal may acquire and/or receive the pre-determined target alarm clock activation time $t_0$, and then may determine a relationship between the current time $t_1$ and the alarm clock activation time $t_0$ according to the monitored current time $t_1$. If the time $t_1$ reaches the target alarm clock activation time $t_0$, that is, a time difference between the current time $t_1$ and the target alarm clock activation time $t_0$ is 0, which is certainly less than the first reference time period $\Delta t_1$ (e.g., $\Delta t_1$=2 minutes), the processor may execute startup operation to awaken the mobile terminal. Alternatively, if the current time $t_1$ is before the target alarm clock activation time $t_0$ and is within the first reference time period $\Delta t_1$ (i.e., $t_1$ is less than 2 minutes earlier than $t_0$), the processor may also execute the startup operation to awaken the mobile terminal.

For a mobile terminal having an Android™ operation system, the Android™ operation system may issue and/or release a startup signaling identifier (e.g., boot.complete) upon completion of the startup to inform all applications that the mobile terminal has completed the startup operation and now is fully functional. When the processor of the mobile terminal monitors and acquires and/or receives the signaling identifier in real time, the processor may record the current time as $t_2$. Thus $t_2$ may correspond to a startup-completion time that the mobile terminal completes the startup and release the signaling identifier. In the scenario that the mobile terminal starts up at the target alarm clock activation time (i.e., $t_1=t_0$, the time $t_1$ reaches at the target alarm clock activation time $t_0$), the time $t_2$ must be later than the target alarm clock activation time $t_0$, that is, at the time $t_2$ that the mobile terminal completes the startup, it is already later than the pre-determined target alarm clock activation time $t_0$. The startup times for different model of mobile terminal (e.g., mobile phone systems) are different. Therefore the time $t_2$ delayed from $t_1$ may differ depending on the model and operating system of a mobile terminal.

After determining that the startup-completion time is the actual alarm clock activation time, the processor may execute the alarm clock activation operation and ring the tone. To this end, because the operation system of the mobile terminal may issue a signaling identifier every time that the mobile terminal starts up, the processor may determine if a target alarm clock activation time that the processor used to compare with the startup-completion time is the right time to execute the alarm clock activation, i.e., if the processor is about to execute an alarm clock activation that is meant to be executed when the mobile terminal is turned off (i.e., a shutdown alarm clock activation), or the target alarm clock activation time to compare refers to an alarm activation that the processor should have executed when the mobile terminal was turned on (i.e., turn-on alarm clock activation).

To this end, the processor of the mobile terminal may conduct the following operations. The processor may compare the startup-completion time $t_2$ with a target alarm clock activation time $t_0$. If the time difference is smaller than or equal to the second reference time period $\Delta t_2$, the corresponding alarm clock activation may be a shutdown alarm clock activation. In this case, the processor may execute the alarm clock ringing operation if the corresponding state identifier also shows that the corresponding alarm clock activation has not yet been executed. If the time difference is larger than the second reference time period $\Delta t_2$ (meaning that the event is a turn-on alarm clock activation or that the mobile terminal was turned on too late), or if the corresponding state identifier shows that the alarm clock activation has been executed, the processor may not execute the target alarm clock activation operation. For example, if the startup-completion time is 9:05 A.M., and a target alarm clock activation time recorded in the queue is 9:00 A.M., within the 5 minutes second reference time period $\Delta t_2$ from the 9:00 A.M. target alarm clock activation time, and the event tag corresponding to the time 9:00 A.M. event is "1," meaning no alarm clock activation has been executed at 9:00 A.M., the time is determined to be the shutdown alarm clock activation time and the alarm clock activation operation is executed.

Alternatively, the mobile terminal may further include an additional identifier (e.g., adding an additional event tag in Table I) illustrating the reason of the most recent startup operation. The processor may execute the alarm clock activation operation only when the additional identifier shows that it is an alarm clock activation event that triggers the recent start-up of the mobile terminal. In addition, the mobile terminal may also include the second reference time period $\Delta t_2$ for each alarm clock activation event in Table I, so that the processor may extract the second reference time period $\Delta t_2$ once received the startup-completion time.

After the alarm clock activation operation is executed, the processor may need to further determine when to terminate the operation, i.e., if the alarm clock activation operation should be terminated or continued. For example, if the purpose of the alarm clock is to awaken up a person from sleep in the morning, when people usually feel sleepy, the processor may be configured to terminate the alarm clock activation operation only after the person conduct a substantial and affirmative action on the mobile terminal in order to ensure that the person does have been awaken up. To this end, the processor may require the person to slide a sliding block to a designated area or to operate the sliding block along a pre-defined path in order to terminate the alarm clock activation operation. The slicing block may be a physical sliding block or button on the mobile terminal or a virtual sliding block shown on a touchscreen of the mobile terminal. Accordingly, the designated area and pre-defined path may be a physical area and path on the mobile terminal, respectively, or may be a virtual area and path on the touchscreen of the mobile terminal. Further, the pre-determined path may be a straight line, a regular or irregular curve, or a polyline (zigzag line) that passing through multiple designate areas under a pre-defined order.

According to another example embodiment of the present disclosure, the affirmative action may instruct the processor of the mobile terminal to continue the alarm clock ringing, terminate the alarm clock ringing, terminating the alarm clock ringing and resume the alarm clock ringing after a pre-determined period of time, and/or terminating the alarm clock ringing and turning off the mobile terminal. For example, the processor of mobile terminal may be pre-set to stop the alarm clock and shut down the mobile terminal, and then resume the alarm clock ringing several minutes later.

Figure 3:
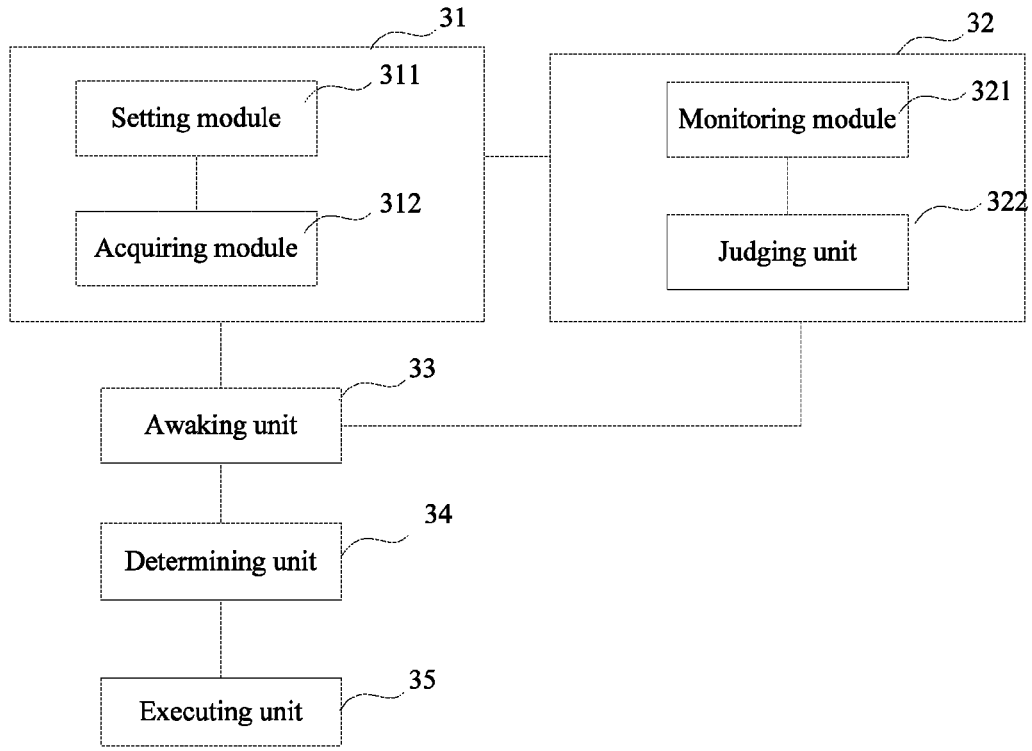
FIG. 3 illustrates a structure diagram of a mobile terminal according to the first example embodiment of the present disclosure.

FIG. 3 illustrates a function diagram of a mobile terminal according to the first example embodiment of the present disclosure. The mobile terminal may comprise a system control unit 31, a timer 32, an awakening unit 33, a determining unit 34 and an executing unit 35. These units may be hardware unit of the mobile terminal. The units may also be software unit stored in a non-transitory processor-readable storage media of the mobile terminal. Each unit may include a set of instructions for operations on the mobile terminal. Further, a processor of the mobile terminal may be configured to communicate with the storage medium and/or hardware unit and execute the sets of instructions.

The system control unit 31 may comprise a setting module 311 configured to set a target alarm clock activation time when the mobile terminal starts up. The system control may also comprise an acquiring module 312 configured to acquire and/or receive the target alarm clock activation time pre-determined by the setting module 311.

The timer 32 may comprise a monitoring module 321 configured to monitor the current time. The timer 32 may also comprise a judging unit 322 configured to monitor a first time difference between the current time and the target alarm clock activation time and compare the first time difference with a first reference time period.

The awakening unit 33 may be configured to awaken the mobile terminal by executing a startup operation. When the processor determines that the first time difference is less than the first reference time period, the processor may execute the awaken unit 33 to awaken the mobile terminal.

The determining unit 34 may be configured to determine if the current time is the actual alarm clock activation time when acquiring a signaling identifier which is released in system startup and corresponds to startup.

The executing unit 35 may be configured to start the alarm clock to execute the ringing operation according to the determined actual alarm clock activation time.

Figure 4:
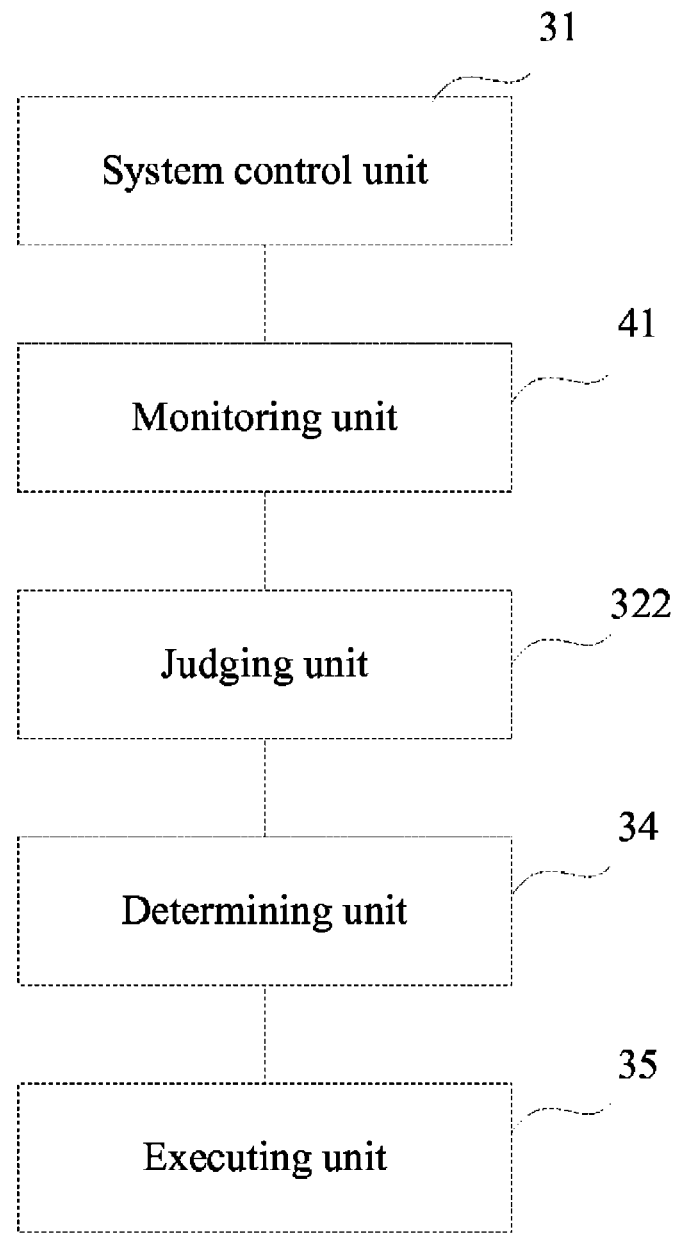
FIG. 4 illustrates a structure diagram of a mobile terminal according to a second example embodiment of the present disclosure.

FIG. 4 illustrates a function diagram of a mobile terminal according to a second example embodiment of the present disclosure. In addition to the system control unit 31, the judging unit 322, the determining unit 34, and the executing unit 35, the mobile terminal shown in FIG. 4 may also comprise a monitoring unit 41 configured to monitor and acquire and/or receive the signaling identifier, which may be released in system startup controlled by the system control unit 31 and corresponds to startup in real time.

Once the mobile terminal completes the startup, the processor may issue and/or release a signaling identifier in real-time, e.g., boot.complete for Android™ system, to inform all applications of the mobile terminal that the system has completed the startup and now is under the wake-up state. As a result, the processor may monitor and acquire and/or receive the signaling identifier in real time and may use the signaling identifier for determining and/or judging whether the current mode and/or state of the mobile terminal is under operation mode (i.e., the mobile terminal has been awaken completely).

The judging unit 322 may be configured to judge a second time difference between the time corresponding to the received signaling identifier (i.e., startup-completion time) and the pre-determined target alarm clock activation time. The judging unit 322 may also be configured to compare a second reference time period with the time difference. When the processor determines that the second time difference is less than the second reference time period, the determining unit 34 may further be configured to determine that the startup completion time is the actual alarm clock activation time.

The executing unit 35 may be configured to start the alarm clock to execute the ringing operation according to the determined actual alarm clock activation time.

Figure 5:
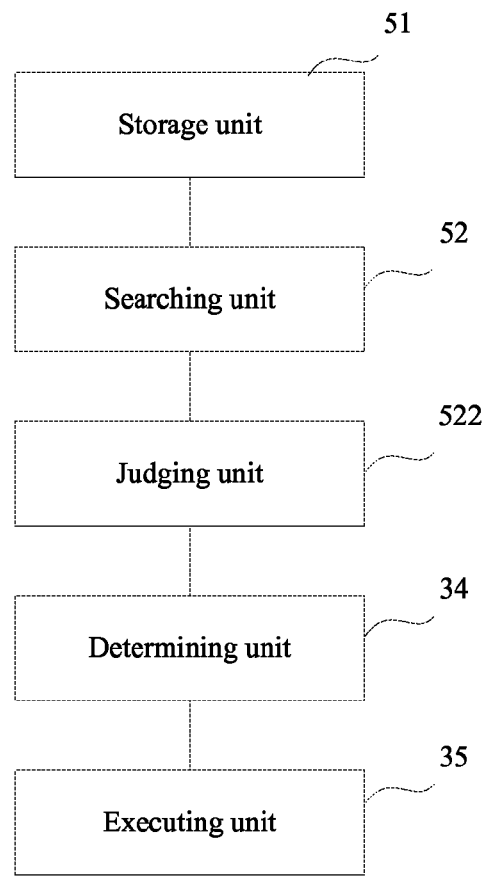
FIG. 5 illustrates a structure diagram of a mobile terminal according to a third example embodiment of the present disclosure.

FIG. 5 illustrates a function diagram of a mobile terminal according to a third example embodiment of the present disclosure. In addition to the determining unit 34 and the executing unit 35, the mobile terminal shown in FIG. 5 may also comprise a storage unit 51, configured to store a tag of the state identifier corresponding to each set time saved in a queue (e.g., the list of time for events in Table I); a searching unit 52, configured to search a corresponding state identifier within the second reference time period from the startup-completion time. Further, the mobile terminal may comprise the judging unit 522, configured to judge the corresponding state identifier within the second reference time period from the startup-completion time.

If the state identifier is alarm clock startup identifier (i.e., the identifier is corresponding with an alarm clock activation event and the value is "1"), the determining unit 34 may be further configured to determine the current time is the actual alarm clock activation time, and the executing unit 35 may execute the alarm clock ringing operation.

Further, the storage unit 51 may be configured to store a ring tone for the alarm clock. The ring tone that is selected as alarm clock ring may be copied into a storage unit of the system from an SD card. The SD card may not be activated when the system is awakened to execute the ringing operation of the alarm clock. Thus if the ring tone is saved on the SD card, there will be only blare or beep prompt tones self-provided in the system rather than the selected ring tone when mobile terminal is awakened to execute the alarm clock activation operation. After the target alarm clock activation time is set and/or determined, the ring tone is recorded and saved in the storage unit of the mobile terminal.

Figure 6:
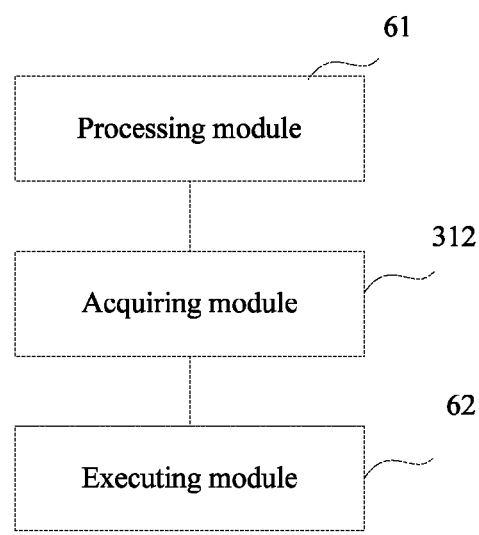
FIG. 6 illustrates a structure diagram of a mobile terminal according to a fourth example embodiment of the present disclosure.

FIG. 6 illustrates a function diagram of a mobile terminal according to a fourth example embodiment of the present disclosure. The mobile terminal may comprise a processing module 61, an executing module 62, and the acquiring module 312. The processing module 61 may be configured to process an operating instruction for the ringing operation. The acquiring module 312 may be configured to acquire and/or receive the operating instruction for processing. The executing 62 may be configured to execute to continue or terminate the alarm clock activation operation according to the operating instruction for processing.

As described above, methods and devices according to example embodiments of the present disclosure may comprise an awakening module configured to awaken a system of a mobile terminal to start under a shutdown state. The methods and devices may also comprise a monitoring unit configured to monitor a startup state and the shutdown state of the system in real time. The monitoring unit may be able to monitor the current time in real time. When the monitoring unit detects and/or determine that the current time reaches at the set alarm clock time, an instruction may be sent out to the awakening unit to awaken up operation systems of the devices. Whether the time that the operation system completes the startup, i.e., the startup-completion time, is the actual alarm clock activation time may be judged and/or determined according to the determination of the determining unit; and the ringing operation may be executed when the startup-completion time is determined to be the actual alarm clock activation time. Thus the function of implementing alarm clock ringing under the shutdown state may be improved, the user experience may be improved, the service life of a battery may be saved, and the consumption of the mobile phone may be reduced.

In addition, a person of ordinary skill in the art may understand that the drawings are only schematic diagrams of preferred example embodiments; and modules or flows in the drawings may or may not be required by implementing the present disclosure. The person of ordinary skill in the art may understand that the modules in the device of the example embodiments may be changed and rearranged in one or a plurality of devices. The modules of the example embodiments may be combined into one module or may further be divided into a plurality of sub-modules. The serial numbers of the example embodiments of the present disclosure are for descriptions only, but not intended to represent the advantages and disadvantages of the example embodiments. It should be clear that a person of ordinary skill in the art may make any alternation and deformation on the present disclosure within the spirit and scope of the present disclosure. Thus, if these modifications and deformations of the present disclosure belong to the scopes of the claims of the present disclosure and equivalent arts, the present disclosure intends to include these modifications and deformations.

What is claimed is:

1. A terminal device, comprising:
   at least one non-transitory storage medium comprising an application executable by a processor for operating an alarm clock function when the terminal device is turned off;
   at least one processor in communication with the at least one storage medium, wherein when executing the application, the at least one processor is programmed to:
      receive an alarm clock activation time associated with a target alarm clock function of the terminal device;
      when the terminal device is in a shut-down condition:
         automatically conduct a startup operation to the terminal device;
         determine a time difference between a startup-completion time and the alarm clock activation time, wherein the startup-completion time is a time when the startup operation is completed;

compare the time difference with a reference time period; and determine an actual alarm clock activation time and an actual alarm clock activated function based on the target alarm clock function and a result of the comparison; and execute the actual alarm clock activated function at the actual alarm clock activation time.

2. The terminal device of claim 1, wherein the terminal device is a mobile phone.

3. The terminal device of claim 1, wherein the actual activated function is the target alarm clock function when the target alarm clock function has not been executed; and the result of the comparison is that the time difference is less than the reference time.

4. The terminal device of claim 1, wherein the actual activated function is an operation other than the target alarm clock function of the terminal device when the target alarm clock function has been executed; or the result of the comparison is that the time difference is greater than the reference time.

5. The terminal device of claim 1, wherein to conduct the startup operation to the terminal device, the at least one processor is further programmed to:

monitor a current time by a clock of the executing unit;

determine a first time difference between the current time and the target alarm clock activation time;

compare the first time difference with a first reference time period; and execute the startup operation when the time difference is less than the first reference time period.

6. The terminal device of claim 5, wherein the first time difference is stored in a storage medium accessible by a clock of the processor when the terminal device is off.

7. The terminal device of claim 1, wherein the alarm clock activation time is associated with the target alarm clock function through an event identifier; and the alarm clock activation time is received when the terminal device is on.

8. The terminal device of claim 1, wherein when the terminal device is on, the at least one processor is further programmed to store a set of instructions associated with the target alarm clock function in a storage medium of the at least one storage medium accessible by the at least one processor when the terminal device is off.

9. The terminal device of claim 1, wherein the at least one executing unit is further configured to:

receive an instruction to an operation of the actual activated function from a user of the terminal device; and execute the instruction.

10. The terminal device of claim 9, wherein the instruction comprises one of terminating the actual activated function, continuing the actual activated function, temporarily terminating the actual activated function and resume the actual activated function after a pre-determined period of time, and terminating the actual activated function and turning off the terminal device.

11. A method for activating an alarm clock function of a terminal device when the terminal device is under a shutdown state, the method comprising:

receiving, by the terminal device, an alarm clock activation time associated with a target alarm clock function;

when the terminal device is in a shut-down condition:

automatically conducting, by the terminal device, a startup operation to the terminal device;

determining, by the terminal device, a time difference between a startup-completion time and the alarm clock activation time, wherein the startup-completion time is a time when the startup operation is completed;

comparing, by the terminal device, the time difference with a reference time period; and determining, by the terminal device, an actual alarm clock activation time and an actual alarm clock activated function based on the target alarm clock function and a result of the comparison; and executing, by the terminal device, the actual activated function at the actual activation time.

12. The method of claim 11, wherein the terminal device is a mobile phone.

13. The method of claim 11, wherein the actual activated function is the target alarm clock function when the target alarm clock function has not been executed; and the result of the comparison is that the time difference is less than the reference time.

14. The method of claim 11, wherein the actual activated function is an operation other than the target alarm clock function of the terminal device when the target alarm clock function has been executed; or the result of the comparison is that the time difference is greater than the reference time.

15. The method of claim 11, wherein the conducting of the startup operation comprises:

monitoring a current time by a clock of the executing unit;

determining a first time difference between the current time and the target alarm clock activation time;

comparing the first time difference with a first reference time period; and executing the startup operation when the time difference is less than the first reference time period.

16. The method of claim 15, wherein the first time difference is stored in a storage medium accessible by a clock of the terminal device when the terminal device is off.

17. The method of claim 11, wherein the alarm clock activation time is associated with the target alarm clock function through an event identifier; and the alarm clock activation time is received when the terminal device is on.

18. The method of claim 11, further comprising, when the terminal device is on, storing, by the terminal device, a set of instructions associated with the target alarm clock function in a storage medium accessible by a processor of the terminal device when the terminal device is off.

19. The method of claim 11, further comprising:

receiving, by the terminal device, an instruction to an operation of the actual activated function from a user of the terminal device; and executing, by the terminal device, the instruction.

20. The method of claim 19, wherein the instruction comprises one of terminating the actual activated function, continuing the actual activated function, temporarily terminating the actual activated function and resume the actual activated function after a pre-determined period of time, and terminating the actual activated function and turning off the terminal device.

* * * * *